United States Patent Office 3,739,058
Patented June 12, 1973

3,739,058
PRODUCTION OF A PAPER PIGMENT GRADE MAGNESIUM HYDROXIDE PRODUCT
John Neil Periard, Bay City, Mich., assignor to The Dow Chemical Company, Midland, Mich.
No Drawing. Filed Aug. 27, 1970, Ser. No. 67,625
Int. Cl. C01f 5/14
U.S. Cl. 423—161          3 Claims

ABSTRACT OF THE DISCLOSURE

A method which comprises: slaking dolime, which has a surface area of from about 1 to about 15 m.$^2$/g., to hydrate the magnesium oxide and calcium oxide; adding the slaked dolime to a $Mg^{++}$ containing brine in an amount sufficient to react up to about 90% of the $Mg^{++}$, the reaction mixture also containing at least about 200 p.p.m. boron; reacting the $Ca(OH)_2$ of the slaked dolime with the $Mg^{++}$ at a temperature from about 50° C. to 75° C. to form $Mg(OH)_2$; and separating the magnesium hydroxide solids from the residual liquor. The magnesium hydroxide product so made is highly useful as a component in a paper pigment formulation.

BACKGROUND OF THE INVENTION

A conventional method of preparing magnesium hydroxide is to react a magnesium ion-containing brine with slaked dolime. The magnesium hydroxide produced from the reaction and from the slaked dolime is separated from the residual mother liquor and used in many different applications.

It has been proposed that magnesium hydroxide be used as a component in a paper pigment formulation to increase opacity.

An object of the present invention is to provide a method of producing pigment grade magnesium hydroxide product using dolime and a magnesium ion-containing brine as raw materials.

THE INVENTION

The present process comprises: slaking dolime, having a surface area of from about 1 to about 15 square meters per gram (m.$^2$/g.), to form magnesium hydroxide and calcium hydroxide; adding the slaked dolime to a magnesium ion-containing brine in an amount sufficient to react up to about 90% of the magnesium ion, the dolime-brine mixture also containing at least about 200 p.p.m. boron; reacting the calcium hydroxide of the slaked dolime with the magnesium ion at a temperature within the range of from about 50° C. to about 75° C. to form magnesium hydroxide; and separating the magnesium hydroxide, formed from reaction and from slaking dolime, from residual liquor. The magnesium hydroxide product so made can be washed to remove soluble impurities and employed wet or dry in pigment coating formulations to produce a paper having high opacity.

Preferably the slaked dolime, prior to addition to the brine, is aged, i.e. held in the slaking solution for a time after the dolime is essentially slaked. This reduces grits in the slaked dolime and has a beneficial effect on the filterability and pigment properties of the resultant magnesium hydroxide product.

The prescribed dolime corresponds to a relatively reactive form of dolime. In calcining dolomite, the kiln is operated so that the dolime is burned only hard enough to substantially decompose the carbonates. The $CO_2$ content is on the order of 0.25–0.50%. The dolime is white, relatively soft and nearly absent of core.

Such dolime is usually slaked at elevated temperatures, e.g. 75–100° C. in a water slaking solution for several hours. $CaCl_2$ can be added to the slaking solution to improve the filterability of the magnesium hydroxide product. However, such addition causes a grit problem since the dolime particles do not subdivide as completely.

The slaked dolime is added to a magnesium ion-containing brine, e.g. sea water or inland $MgCl_2$ brines, in an amount sufficient to react up to about 90% of the $Mg^{++}$ present in the brine, i.e. the reaction mixture is in an underlimed condition. Reacting more than about 90% of the $Mg^{++}$ has a detrimental effect on the pigment properties of the resultant product.

The slaked dolime-brine mixture should contain at least about 200 p.p.m. boron, preferably 250 to 500 p.p.m. This is introduced as a natural impurity in the brine and/or added to the brine, slaked dolime or mixture as a soluble salt, e.g. sodium borate. It has been found that the presence of boron during the precipitation of magnesium hydroxide is beneficial to the pigment properties. This is due at least in part to the adsorption of boron in the $Mg(OH)_2$.

The calcium hydroxide of the slaked dolime reacts with the magnesium ion of the brine to precipitate $Mg(OH)_2$. Such reaction is carried out at a temperature within the range of from about 50° C. to about 75° C. Reaction temperatures both above and below these limits have a detrimental effect on the opacity of resultant $Mg(OH)_2$ product. Reaction times are on the order of 15 to 30 minutes.

The magnesium hydroxide precipitated during reaction and the magnesium hydroxide from the slaked dolime, i.e. the magnesium hydroxide solids, are separated from the residual mother liquor, e.g. aqueous $CaCl_2$ solution where $MgCl_2$ brine is used. Separation is carried out by filtration or other suitable means.

The product is water washed to remove soluble impurities and usually spray dried.

The process can be carried out in a batch or continuous manner.

Opacifying power of pigment formulations containing the $Mg(OH)_2$ product made by the present process can be determined by use of conventional apparatus using the Mitton-Jacobsen method, whereby a coating is cast on a black glass panel with a Bird doctor blade at a thickness of about one mil. A 5 sq. in. area of this slightly translucent film is measured for reflectance, $R_B$, and likewise the reflectance $R_\infty$ of a thick layer over white glass. These readings are then converted by means of published graphs (Official Digest, vol. 35, September 1963, No. 464) into values of scattering power, the measured area of the coating is then removed from the black glass and weighed, thus enabling expression of the scattering coefficient (S), in terms of an accurately known coating weight unit (lbs. per TAPPI ream).

The following examples serve to illustrate the present invention.

Examples

The following general procedure was used to prepare $Mg(OH)_2$ samples for testing. Water was placed in a one liter agitated slaking flask and the water heated to 70–80° C. Dolime was added to the slaker and digested for 16 hours at 100° C. The resulting dolime slurry was degritted with a 100 mesh screen to remove over-size grits. The dolime slurry was then diluted with water to a 6 N concentration. The dolime slurry was then fed into a baffled, agitated precipitator tank containing a specified amount of brine containing about 3.2 weight percent magnesium chloride. An amount of dolime is added to react with 80–90% of $Mg^{++}$ in the brine. After reaction, the resultant slurry was filtered, the filter cake washed and spray dried. The product was tested for S value in accordance with the aforementioned procedure. Table I presents the relationship of dolime surface are a to S value. Other process conditions were essentially constant. A surface area of 0.47 m.$^2$/g. is too low—the formulation containing $Mg(OH)_2$ made from this product only had an S value of 0.161 (Example A). Dolime samples having surface areas from 1.06 m.²/g. (Example 1) to 4.0 m.²/g. (Example 2) produced $Mg(OH)_2$ which yielded formulations with S values from 0.170 (Example 2) to 0.199 (Example 12).

TABLE I.—Effect of Dolime Surface Area on S Value

| Example | Dolime surface area, m.²/grams | S |
|---|---|---|
| A | 0.47 | 0.161 |
| 1 | 1.06 | 0.176 |
| 2 | 1.1 | 0.170 |
| 3 | 1.12 | 0.181 |
| 4 | 1.3 | 0.174 |
| 5 | 1.34 | 0.175 |
| 6 | 1.35 | 0.171 |
| 7 | 1.45 | 0.180 |
| 8 | 1.51 | 0.180 |
| 9 | 2.0 | 0.183 |
| 10 | 2.1 | 0.183 |
| 11 | 2.4 | 0.188 |
| 12 | 4.0 | 0.199 |

NOTE.—Slaking conditions: 100° C., 12–16 hours; precipitation conditions: 60° C., 30 minutes, brine contained 246–289 p.p.m. B, 80–90% Mg ++ reacted.

Table II demonstrates the correlation between boron concentration in the reaction mixture and the S value. In these examples two brine sources were used. One (source X) had a boron impurity content of about 40 to 60 p.p.m. The other (source Y) had a boron impurity content of about 250–300 p.p.m. Boron was added to the brine as sodium borate, $Na_2B_4O_7$. Low boron resulted in low S values (Examples B, C and E). Even the addition of boron to raise the level to 150 p.p.m. was not sufficient to significantly effect the S value (Example D). However, when the boron level was 270 p.p.m. (Example 16) or more, either present as natural impurity (Example 16) or added (Examples 13–15 and 17), the S value was 0.175 to 0.199. A similar result was noted when the boron was added to the slaked dolime instead of the brine.

TABLE II.—Effect of B Content in Precipitator on S Value

| Example | Brine source | B added to brine, p.p.m. | B total, p.p.m. | S |
|---|---|---|---|---|
| B | X | | 44 | 0.153 |
| C | X | | 44 | 0.158 |
| D | X | 106 | 150 | 0.163 |
| 13 | X | 256 | 300 | 0.175 |
| 14 | X | 256 | 300 | 0.177 |
| 15 | X | 256 | 300 | 0.199 |
| E | Y[1] | | 39 | 0.154 |
| 16 | Y | | 270 | 0.185 |
| 17 | Y | 180 | 450 | 0.180 |

[1] Deboronated.

NOTE.—Slaking conditions: 100° C., 16 hours; slaking index=59° C.; precipitation conditions: 60° C., 30 minutes; 80–90% Mg ++ reacted.

Table III shows the effect of precipitation temperature on S value (other conditions being constant). $Mg(OH)_2$ precipitation temperatures of 25° C. and 40° C. are too low (Examples F and G) while 90° C. is too high (Example H). Temperatures of 50° C., 60° C. and 75° C., all produced pigments with S values of 0.170 or greater.

TABLE III.—Effect of Precipitation Temperature on S Value

| Example | Precipitation temperature, ° C. | S |
|---|---|---|
| F | 25 | 0.158 |
| G | 40 | 0.163 |
| 18 | 50 | 0.171 |
| 19 | 60 | 0.185 |
| 20 | 75 | 0.170 |
| H | 90 | 0.167 |

NOTE.—Slaking conditions: 100° C., 16 hours; slaking index=59° C.; precipitation conditions: 30 minutes (Example F was 77 minutes); 242–281 p.p.m. B: 80–90% Mg ++ reacted.

What is claimed is:

1. A method of making a pigment grade magnesium hydroxide having an S value greater than 0.170 which comprises:
   (a) slaking dolime, which has a surface area of from about 1 to about 15 meters squared per gram, to hydrate the calcium oxide and magnesium oxide;
   (b) adding said slaked dolime to a magnesium ion-containing brine in an amount sufficient to react up to about 90 weight percent of the magnesium ion present in the brine; the mixture so formed also containing at least about 200 p.p.m. boron;
   (c) reacting the calcium hydroxide of the slaked dolime with the magnesium ion of the brine at a temperature within the range of from about 50° C. to about 75° C.;
   (d) separating the magnesium hydroxide solids from residual liquor, whereby a magnesium hydroxide with improved scattering coefficient is obtained.

2. The method of claim 1 including the step of aging the slaked dolime prior to adding it to the brine.

3. The method of claim 1 wherein the boron content of the mixture in step (b) is from about 250–500 p.p.m.

References Cited

UNITED STATES PATENTS

| 3,451,774 | 6/1969 | Thompson et al. | 23—201 |
| 3,232,708 | 2/1966 | Chisholm | 23—201 |
| 3,425,804 | 2/1969 | Rastrelli | 23—201 |

OSCAR R. VERTIZ, Primary Examiner

G. ALVARO, Assistant Examiner

U.S. Cl. X.R.

423—637

UNITED STATES PATENT OFFICE
CERTIFICATE OF CORRECTION

Patent No. 3,739,058               Dated   June 12, 1973

Inventor(s)  John N. Periard

It is certified that error appears in the above-identified patent and that said Letters Patent are hereby corrected as shown below:

Column 2, line 69 change "are a" at the end of the line to --area--.

Column 3, line 24, change "246" to --242--.

Column 3, line 48, place an "S" in the title section above the last column of figures.

Signed and sealed this 1st day of October 1974.

(SEAL)
Attest:

McCOY M. GIBSON JR.                    C. MARSHALL DANN
Attesting Officer                      Commissioner of Patents